United States Patent [19]

Bemis

[11] 3,775,118

[45] Nov. 27, 1973

[54] PHOTOMECHANICAL METHOD OF PRODUCING GROUNDED PRINTED CIRCUITS

[76] Inventor: Stuart A. Bemis, 176 High St., Winchester, Mass. 01890

[22] Filed: Dec. 14, 1971

[21] Appl. No.: 207,750

[52] U.S. Cl. .................. 96/36.2, 96/27 R, 96/27 E, 96/36, 96/41, 96/43, 96/44, 96/46

[51] Int. Cl. .................. G03c 5/00

[58] Field of Search .................. 29/624, 625; 96/44, 96/41, 43, 27 E, 27 R, 36, 36.2, 46

[56] References Cited

UNITED STATES PATENTS

| | | | |
|---|---|---|---|
| 1,967,057 | 7/1934 | Irvine | 96/44 |
| 3,423,205 | 1/1969 | Skaggs et al. | 96/36.2 |
| 2,752,245 | 6/1956 | Hough et al. | 96/43 |
| 3,169,063 | 2/1965 | Johnston et al. | 96/36.2 X |
| 1,725,395 | 8/1929 | Fruwirth | 96/44 |
| 3,508,826 | 4/1970 | Grabau | 96/44 X |
| 3,510,305 | 5/1970 | Craig et al. | 96/44 |
| 3,669,666 | 6/1972 | Kleitman et al. | 96/41 |

OTHER PUBLICATIONS

Bulletin for the Graphic Arts; No. 8, Eastman Kodak, 1946.

*Primary Examiner*—Charles L. Bowers, Jr.
*Attorney*—Harry A. Herbert, Jr. et al.

[57] ABSTRACT

A photomechanical method of producing a grounded printed circuit utilizing an ungrounded circuit negative, a base film and a transparent sheet sandwiched therebetween. This film package is mounted on a turntable and exposed to a light source while the turntable is being rotated. Development of the exposed base film produces a negative mask. This negative mask is used in conjunction with the original ungrounded circuit negative to produce a composite positive which contains the required ground plane and upon which any further terminal grounding can be made. The resultant grounded composite negative is utilized to form the grounded printed circuit.

2 Claims, 8 Drawing Figures

INVENTOR
STUART A. BEMIS
BY Harry A. Herbert Jr. and Jacob N. Erlich
ATTORNEYS

INVENTOR.
STUART A. BEMIS
BY Harry A. Herbert Jr.
and
Jacob N. Erlich
ATTORNEYS

INVENTOR
STUART A. BEMIS
BY Harry A. Herbert Jr and Jacob N. Erlich
ATTORNEYS

PHOTOMECHANICAL METHOD OF PRODUCING GROUNDED PRINTED CIRCUITS

BACKGROUND OF THE INVENTION

This invention is an improvement over the method of producing grounded printed circuits disclosed in application Ser. No. 207,901 filed Dec. 14, 1971 by the inventor of this application.

This invention relates generally to a method of making printed circuits, and more particularly to an improved photomechanical method of producing grounded printed circuits.

Printed circuits make economical mass production possible, save space and weight, and increase reliability of electronic equipment. They are used in practically all types of electronic equipment, such as radio and TV sets; electrical wiring behind the dashboard in automobiles; guided-missile and airborne electronic equipment, computers; and industrial control equipment.

The rapid adoption of the graphic art processes by the electronics industry is a demonstration of the effectiveness of those processes in achieving cost reduction and equipment miniaturization. These printed circuits are of interest to industry for the following reasons:

1. Printed circuits are the common denominator for almost all approaches to the mechanized fabrication of electronic equipment.

2. Use of printed circuits has greatly reduced the labor required for the wiring of an electronic circuit.

3. Uniformity of printed circuits improves the quality of the product through simplification of quality control.

4. Printed circuitry has helped to minimize one major cause of unreliability in electronic equipment by permitting the use of dip-soldering processes.

A common method of producing a printed circuit is set forth hereinbelow. A schematic draftsman, working from a sketch prepared by an engineer, uses precut or preprinted pres-on symbols and tapes to lay out the circuit on a sheet of matte mylar. Although these circuit masters can be done at the same size as the required finished circuit, they are more often done at a larger size —2:1, 4:1, 5:1, 10:1 — and when extreme accuracies are required these ratios are apts to increase considerably. After checking by the engineer, the circuit master is sent to a photo laboratory where it is reduced to the desired finished size on a lithographic film by use of a process camera. The resulting negative is sent to the etching shop. Here, usually in a vacuum system, the negative is placed in intimate contact with a copper-clad plastic board which has been coated with a photo resist. The negative and board are then exposed to an ultra-violet light source which hardens the resist wherever the clear areas appear on the negative. The unhardened resist (the areas under the black parts of the negative) is then developed away, leaving etchant-resistant copper where the circuit terminals and wires are, and unprotected copper in the other areas. The board is then etched, removing the unprotected copper. Finally, a dipping in a resist solvent removes the hardened resist, leaving a plastic board with copper wiring, and terminals on which to mount components.

Two recent developments have made the preparation of printed circuits more difficult for the schematic draftsman. First, it was discovered that "cramping" the circuit area as much as possible measurably increases the speed of the circuit operations. Second, it was found that by individually grounding the sub-circuits and terminals, the impedance and noise of the circuit is kept low. In high frequency circuits, it prevents the interference of one signal with another and, in general, improves the overall quality of the circuits. Thus, the draftsman now not only has to lay out the circuit in a much smaller area, but also has to surround the terminal sub-circuits and wires with tape so that a ground plane is available on the final product. This is a tedious and tiring job that requires more than ordinary skill because the tapes must be held at specific distances from the terminals and wires for both performance and appearance sake. Errors due to lapses in concentration often occur during this taping process, not to mention the time required for such a task. It is not uncommon for a draftsman to spend a full day inserting a ground plane in this manner.

The invention set forth in Ser. No. 207,901 by the inventor of this application overcomes most of the problems set forth hereinabove; however, the sharpness of the mask produced thereby could still be improved upon. For example, some opaquing of the ground plane may be necessary after completion of the mask.

SUMMARY OF THE INVENTION

The method of the instant invention overcomes the problems set forth in detail hereinabove by (1) substantially reducing the time required to create the grounding plane of a printed circuit, and (2) producing an improved mask having controllable insulation gaps and a sharp image on the edge of the ground plane.

Producing printed circuits with the photomechanical method of this invention reduces the time required to create the ground plane to approximately 45 minutes. The printed circuit master is prepared in a conventional manner by a draftsman; omitting the step of taping in any ground plane. Using any suitable process camera the printed circuit master is reduced to its final desired size. The resulting negative is opaqued to remove any pinholes therein after it has thoroughly dried. In the method of the instant invention the negative is now turned upside down in order to print through the base and is punched for two-hole registration using any convention system whose pins can be utilized in a vacuum frame. A clear sheet of Mylar or polyester and an unexposed piece of film are also punched in the same manner as the negative. These three sheets, the negative, the clear Mylar and the unexposed film are printed together and exposed with a light source placed at an angle to the film package which has been mounted on a suitable turntable. The turntable is rotated while the exposure is made in order to obtain an "undercut" in 360°. By either increasing or decreasing the spacing between the negative emulsion and the film or mask emulsion, or by increasing or decreasing the angle of illumination, the insulation or void between the circuit and ground can be increased or decreased. The exposed film is now developed in a non-infectious type lithographic developer thereby producing a predictable mask. By use of these two controls and a non-infectious type lithographic developer, a predictable gap can be produced on the finished boards.

In the next step in the method of this invention, the original negative and the mask are now contacted, one at a time onto an unexposed piece of film that has been punched for composite registration therewith. This contacting process takes place with the negatives in an emulsion-to-emulsion contact. The film is then developed normally in any conventional lithographic developer. This resultant composite positive now contains the circuit and a ground plane. The terminals that now require grounding may be easily grounded through the use of either liquid opaque or tape by either the engineer, draftsman or camera man working from either verbal instructions or schematic. The composite positive is now printed back to negative in order to prevent damage to the opaquing or to prevent the tape from being removed. The negative is now ready to be sent out for etching of a final printed circuit by the conventional etching procedures set forth hereinabove.

It is therefore an object of this invention to provide a photomechanical method of producing a grounded printed circuit.

It is another object of this invention to provide a photomechanical method of producing a grounded printed circuit with a minimum amount of labor and time.

It is a further object of this invention to provide a photomechanical method of producing a grounded printed circuit with an improved mask having an extremely sharp image on the edge of the ground plane and a predictable insulation gap.

It is still another object of this invention to provide a photomechanical method of producing a grounded printed circuit which is economical to produce and which utilizes conventional currently available equipment that lends itself to standard mass-producing manufacturing techniques.

For a better understanding of the present invention together with other and further objects thereof, reference is made to the following description taken in connection with the accompanying drawing and its scope will be pointed out in the appended claims.

DETAILED DESCRIPTION OF THE PREFERRED EMBODIMENT

Figure 1:
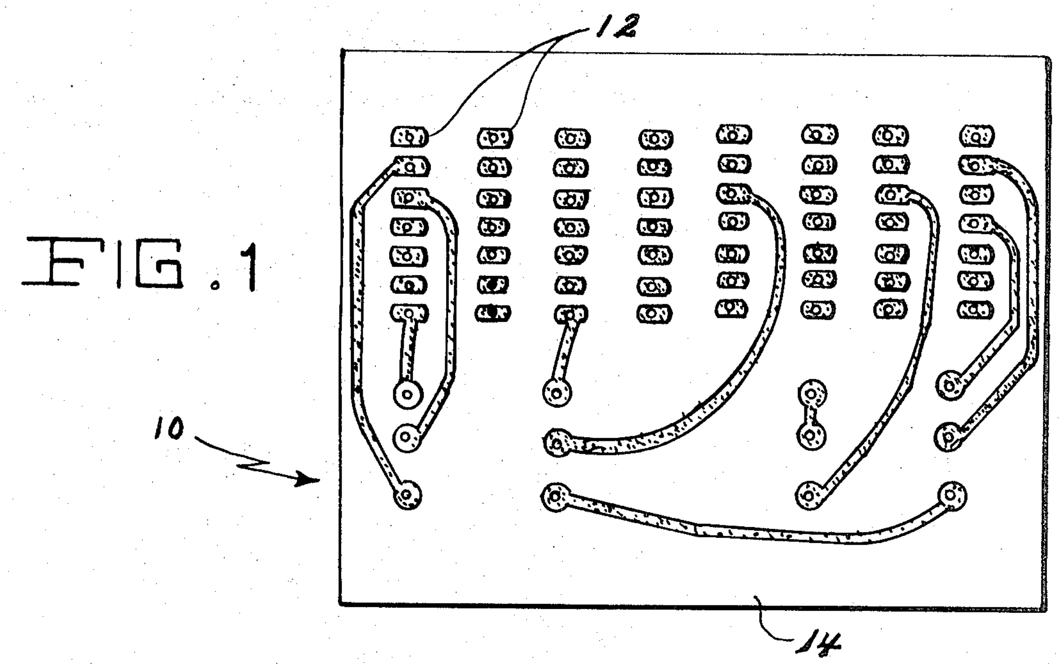
FIG. 1 is a plan view of a non-grounded printed circuit master utilized with the method of this invention.

In the method of the instant invention the initial step in producing a grounded printed circuit is identical to the conventional method used to produce a normal ungrounded circuit negative. As shown in FIG. 1 of the drawing, a draftsman working from a sketch prepared by an engineer prepares a circuit master 10 by using precut or preprinted press-on symbols 12 to lay out the circuit on a sheet of plastic, such as matte Mylar 14. This circuit master 10 is then sent to a photo lab where it is reduced to the desired finished size on a lithographic film by the use of a conventional process camera.

Figure 2:
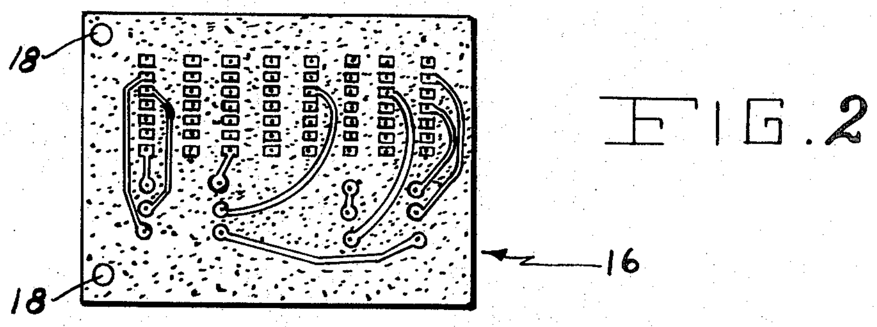
FIG. 2 is a plan view of a reduced negative of the original non-grounded printed circuit utilized with the method of this invention.

The resulting negative 16 as best shown in FIG. 2 is then opaqued when dry to eliminate any pinholes which may be formed therein. The next step in the method of this invention is to punch the negative 16 at 18 with any suitable two-hole registration punch so that this negative 16, when utilized in conjunction with other film, may be set up in proper alignment therewith. This alignment may be accomplished with the use of Carlson ¼ inch pins; however, any other system that acecepts pins that can be used in a vacuum frame will also suffice.

Figure 3:
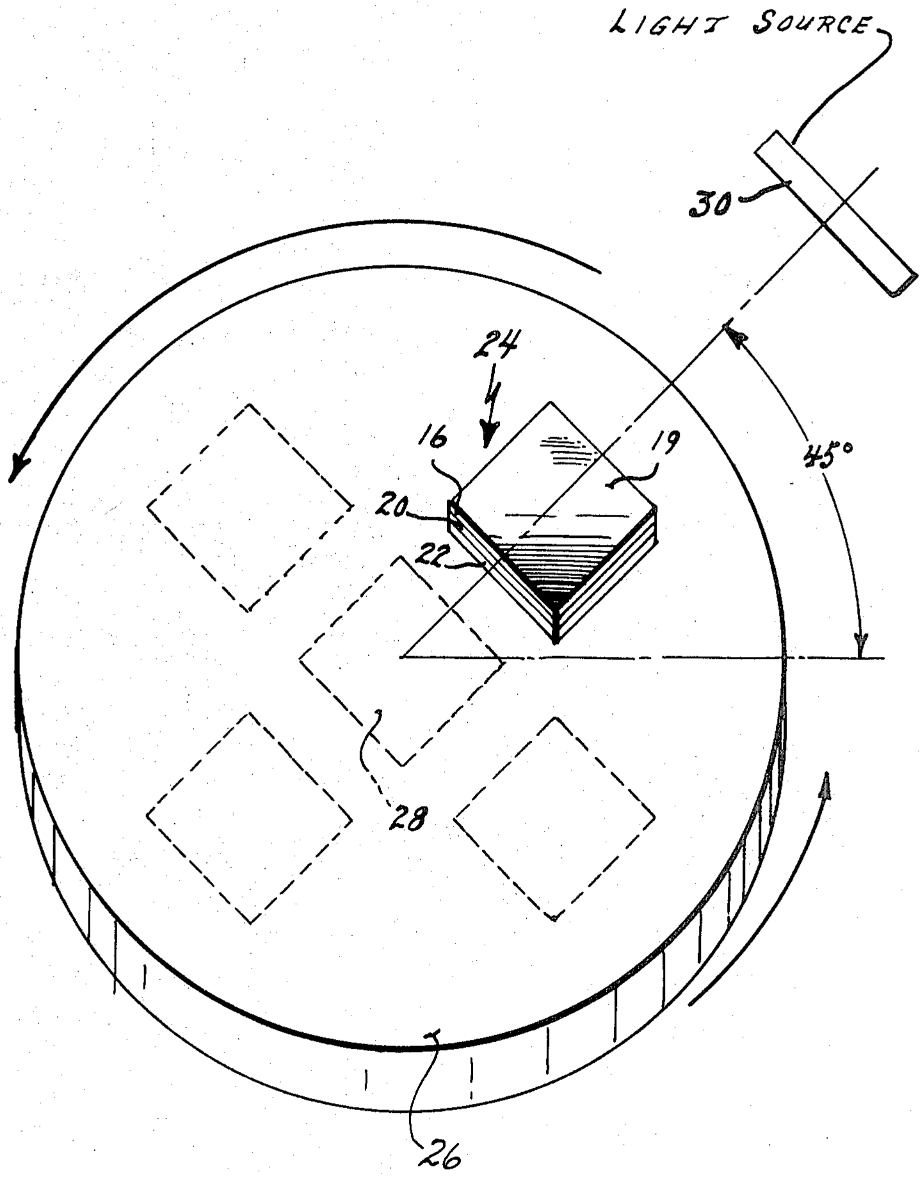
FIG. 3 is a pictorial view of the step of producing a mask in the method of this invention.

Reference is now made to FIG. 3 of the drawing in which the position of negative 16 is reversed so that its emulsion surface 19 is facing upward. With the negative 16 in this position it is pinned to any suitable clear Mylar or polyester sheet 20 which has also been punched (not shown) for alignment purposes. A sheet of unexposed stable base lithographic film 22 which has been similarly punched and also having its emulsion surface upward is now pinned to the other sheets 16 and 20. This film package 24, made up of the processed negative 16 with emulsion surface up, an unexposed sheet of film 22 underneath with emulsion surface up and a clear sheet 20 sandwiched therebetween is now mounted by any conventional mounting means upon any suitable turntable 26. The film package 24 may be positioned anywhere on the surface of turntable 26 as denoted by the dotted lines. Furthermore, a plurality of film packages 26 may be mounted on the turntable if desired. Optimum results, however, are obtained if one such package 24 is located at the center of turntable 26 at 28.

In this invention, rather than diffusing the light penetrating the clear areas of the negative 16 and depending upon an infectious type lithographic developer to spread the image as disclosed in the hereinabove mentioned invention, Ser. No. 207,901, the instant method utilizes an undercut principle. The reduced negative 16 is held away from the film 22 by the clear Mylar sheet 20 and the exposure of the film 22 to produce the mask is made by any suitable point source light 30 placed at an angle, preferably 45°, from the turntable 26. While the exposure takes place the turntable is rotated through 360°. It is also possible, if desired, to hold the turntable 26 stationary and rotate light source 30; however, under certain circumstances this may be undesirable. By either increasing or decreasing the spacing between the negative emulsion and the unexposed mask emulsion, or by increasing or decreasing the angle of illumination, the insulation or void between circuit and ground can be increased or decreased.

Figure 4:
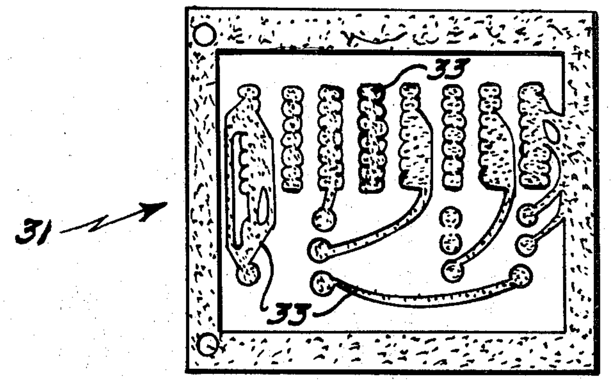
FIG. 4 is a plan view of the blockout mask made from the reduced negative in another step in the method of this invention.

The exposed film 22 is now developed in any conventional non-infectious lithographic developer thereby producing the blockout mask 31 shown in FIG. 4. By use of the two controls set forth above and a non-infectious type lithographic developer, a predictable gap 33 and an extremely sharp image can be produced on the blockout mask 31. This type mask 31 allows more ground connections to run between terminals and reduces the amount of opaquing previously required.

The most noticable differences can be seen on right angles or at corners of sub-circuit terminals. It should be noted that it is necessary for the negative 16 to be printed upside down, that is having its emulsion surface 19 up, so that in the final composite print set described hereinbelow the negative 16 and the film 22 which is now being produced will be printed to the positive state with emulsion to emulsion contact.

Figure 5:
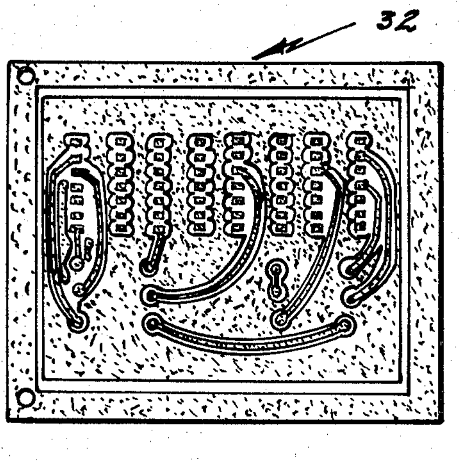
FIG. 5 is a plan view of the composite positive made by printing the reduced negative and blockout mask onto a single sheet of film in another step in the method of this invention.

This mask 31 upon drying is opaqued, if necessary, so that any pinholes therein will be removed and it is fully prepared to produce the composite positive print 32, shown in FIG. 5. Referring to FIG. 5 of the drawing, the composite positive 32 is produced by printing a punched and pinned sheet of unexposed film by contact, at normal exposure time, first to the original negative 16 emulsion-to-emulsion and then to the spread mask 31 emulsion-to-emulsion. This procedure preferably takes place under a vacuum to assure direct contact between the surfaces. The positive 32, best shown in FIG. 5, is now developed in a conventional manner, washed, dried and opaqued.

Figure 6:
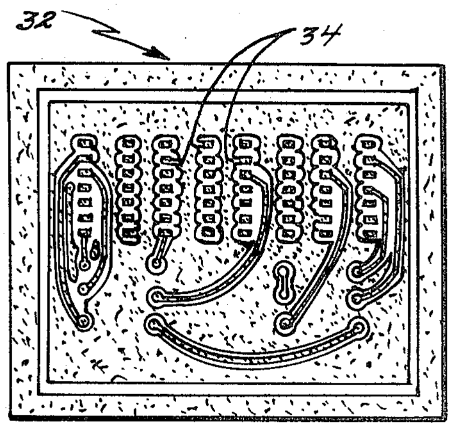
FIG. 6 is a plan view of the composite print with terminals connected to the ground plane in another step in the method of this invention.

FIG. 6 shows the next step of the instant invention which is the process of connecting the terminals which require grounding by either tape or liquid opaque at 34. When the grounding has been completed the composite positive 32 is contacted back to the negative state as shown in FIG. 7 of the drawing.

Figures 7, 8:
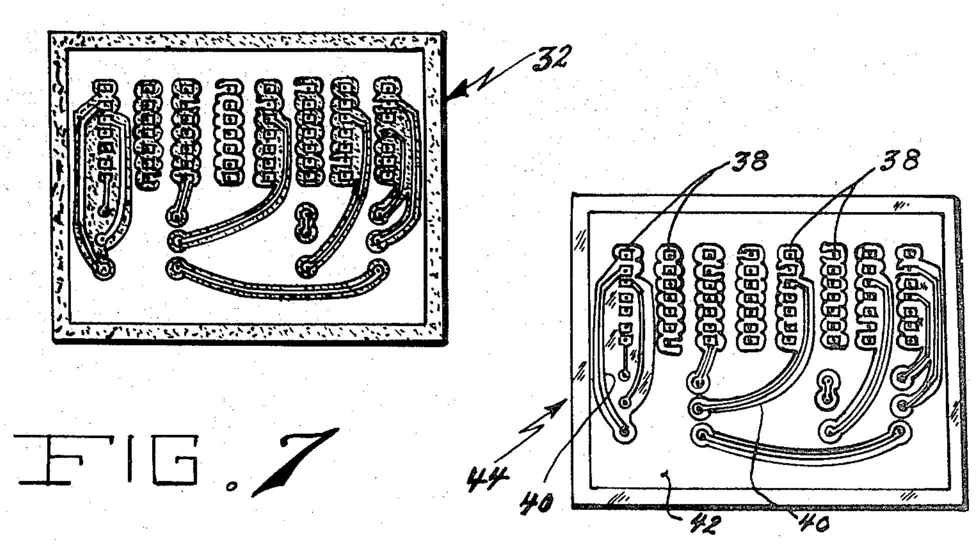
FIG. 7 is a plan view of the finished negative obtained by contact printing the composite positive in another step in the method of this invention.
FIG. 8 is a plan view of a completed grounded printed circuit produced by the method of this invention.

This composite negative 32, shown in FIG. 7, can now be sent to the etching shop where utilizing the conventional method of producing an ungrounded printed circuit, the negative 32 is placed in intimate contact with a copper-clad plastic board which has been coated with a photo resist. The negative and board are then exposed in a conventional manner to an ultraviolet light source which hardens the resist wherever the clear areas appear on the negative. The unhardened resist is then developed away leaving etchant resistant copper where the circuit terminals 38, the wires 40 and the ground plane 42 are located and unprotected copper in the other areas. The board is then etched and the hardened resist is removed thereby producing the grounded printed circuit 44 as best shown in FIG. 8 of the drawing.

The method of this invention will save from 2–8 hours in producing a grounded printed circuit 44. Furthermore, a much neater job is accomplished by this method, thereby enhancing the appearance of the board and allowing for a high saturation of components as compared to the old method. Also, fewer mistakes can be made with the instant method than by the prior art taping method.

Although this invention has been described with reference to a particular embodiment, it will be understood to those skilled in the art that this invention is also capable of a variety of alternative embodiments within the spirit and scope of the appended claims.

I claim:

1. A photomechanical method of producing a grounded printed circuit comprising the steps of:

a. preparing a printed circuit master by affixing symbols in a predetermined pattern to a sheet of plastic;

b. photographing said printed circuit master and reducing the resultant photograph to a desired size;

c. producing a negative from said desired size photograph;

d. forming a laminated structure by sandwiching and aligning a transparent sheet between and in contact with a top layer made up of said negative and a bottom layer made up of a stable base film such that said negative and said stable base film have their respective emulsion surfaces directed upward;

e. mounting said laminated structure on a turntable;

f. positioning a light source above and at an angle with respect to the plane of said turntable;

g. simultaneously rotating said turntable and exposing said laminated structure to said light source;

h. developing said base film, thereby producing a positive blockout mask having a spread image thereon;

i. producing a composite positive of said negative and said positive blockout mask by printing a sheet of unexposed film in emulsion to emulsion contact, first to said negative and then to said positive blockout mask;

j. grounding said symbols in said composite positive by connecting preselected symbols to each other and to a ground plane;

k. producing a grounded composite negative from said grounded composite positive; and l. forming said grounded printed circuit from said grounded composite negative by affixing a conductive material to the upper surface of a plastic board, coating said conductive surface of said plastic board with a photoresist, placing said grounded composite negative in intimate contact with said coated conductive surface of said plastic board, exposing said grounded composite negative and said board to an ultraviolet light source to harden said photoresist wherever clear areas of said grounded composite negative appear, removing said unhardened resist thereby leaving areas of conductive surface having photo-resist thereon and areas of conductive surfaces having no photoresist thereon, removing said conductive surfaces having no photoresist thereon thereby exposing said plastic board therebeneath, and removing said photoresist from said remaining conductive surfaces.

2. A photomethical method of producing a grounded printed circuit as defined in claim 1 wherein said angle of said light source is 45°.

* * * * *